US006614974B2

(12) United States Patent
Elrefaie et al.

(10) Patent No.: US 6,614,974 B2
(45) Date of Patent: Sep. 2, 2003

(54) OPTICAL FIBER HAVING EXTENDED SINGLE-MODE CAPABILITY

(75) Inventors: Aly F. Elrefaie, Cupertino, CA (US); Shih-Yuan Wang, Palo Alto, CA (US)

(73) Assignee: Gazillion Bits Inc., San Jose, CA (US)

( * ) Notice: Subject to any disclaimer, the term of this patent is extended or adjusted under 35 U.S.C. 154(b) by 344 days.

(21) Appl. No.: 09/781,352

(22) Filed: Feb. 12, 2001

(65) Prior Publication Data

US 2002/0012512 A1 Jan. 31, 2002

Related U.S. Application Data

(63) Continuation-in-part of application No. 09/591,474, filed on Jun. 9, 2000.

(51) Int. Cl.⁷ ............................................... G02B 6/02
(52) U.S. Cl. ...................... 385/125; 385/123; 385/124; 385/126
(58) Field of Search ................................ 385/123, 124, 385/125, 126, 127, 128, 129

(56) References Cited

U.S. PATENT DOCUMENTS

| | | | |
|---|---|---|---|
| 5,155,792 A | 10/1992 | Vali et al. .................... | 385/125 |
| 5,802,236 A | 9/1998 | DiGiovanni et al. ........ | 385/125 |
| 5,907,652 A | 5/1999 | DiGiovanni et al. ........ | 385/125 |
| 6,418,258 B1 * | 7/2002 | Wang ......................... | 385/125 |

FOREIGN PATENT DOCUMENTS

WO      WO9964903      12/1999

OTHER PUBLICATIONS

Cherin, "An Introduction to Optical Fibers," McGraw–Hill (1983), pp. 2–3.

Russell, Knight, Birks, Mangan, and Wadsworth, "Recent Progress in Photonic Crystal Fibres," ThG1–1–ThG–3, 980100, Optical Fiber Communication Conference, 2000, Technical Digest Series, Conference Edition, Baltimore, Maryland, Mar. 7–10, 2000 (Optical Society of America).

Monro, Bennett, Broderick, and Richardson, "New Possibilities with Holey Fibers," ThG4–1–ThG4–3, 106–108 Optical Fiber Communication Conference, 2000, Technical Digest Series, Conference Edition, Baltimore, Maryland, Mar. 7–10, 2000 (Optical Society of America).

Windeler and Ranka, "Novel Properties of Air–Silica Microstructure Optical Fibers," ThG3–1–ThG3–2, 104–105 Optical Fiber Communication Conference, 2000, Technical Digest Series, Conference Edition, Baltimore, Maryland, Mar. 7–10, 2000 (Optical Society of America).

Broeng, Barkou, and Bjarkley, "Polarization Properties of Photonic Bandgap Fibers," ThG2–1–ThG2–3, 101–103 Optical Fiber Communication Conference, 2000, Technical Digest Series, Conference Edition, Baltimore, Maryland, Mar. 7–10, 2000 (Optical Society of America).

(List continued on next page.)

*Primary Examiner*—Phan T. H. Palmer
(74) *Attorney, Agent, or Firm*—Cooper & Dunham, LLP.

(57) ABSTRACT

An optical fiber having extended single-mode capabilities is described in which subwavelength microstructural voids are introduced into the core and/or cladding to allow a fine tuning of the difference between their effective refractive indices. The introduction of subwavelength microstructures into the optical material, preferably through a photolithographic process at the preform stage, allows for control of the effective refractive index difference between the core and the cladding that is more precise than the control afforded by chemical doping processes (e.g., flame hydrolysis) alone. Accordingly, the specified effective refractive index difference between the core and the cladding may be made smaller than that allowed by chemical doping processes alone, thereby allowing the optical fiber to exhibit single-mode properties for larger core diameters.

42 Claims, 3 Drawing Sheets

OTHER PUBLICATIONS

Dutton, *Understanding Optical Communications* (Prentice–Hall 1998), Contents and pp. 42–45.
Hecht, *Understanding Fiber Optics*, 3rd ed. (Prentice–Hall 1999), Contents and pp. 68–73.
Keiser, *Optical Fiber Communications*, 3rd ed. (McGraw–Hill 2000), Contents and pp. 70–75.
http://www.blazephotonics.com/pages/techn.htm—dated Mar. 30, 2001.
http://www.blazephotonics.com/pages/press.htm—dated Mar. 30, 2001.

U.S. patent application Ser. No. 09/781,343, filed Feb. 12, 2001.

U.S. patent application Ser. No. 09/781,353, filed Feb. 12, 2001.

U.S. patent application Ser. No. 09/781,341, filed Feb. 12, 2001.

U.S. patent application Ser. No. 09/781,344, filed Feb. 12, 2001.

* cited by examiner

OPTICAL FIBER HAVING EXTENDED SINGLE-MODE CAPABILITY

CROSS-REFERENCE TO RELATED APPLICATIONS

This application is a continuation-in-part of commonly assigned U.S. patent application Ser. No. 09/591,474, filed Jun. 9, 2000, and is related to the subject matter of commonly assigned, patent applications Ser. No. Ser. No. 09/781,343, Ser. No. 09/781,353, Ser. No. 09/781,341, and Ser. No. 09/781,344, each filed on the filing date of the present application. Each of the above patent applications is incorporated by reference herein.

FIELD

This patent specification relates to the field of optical fiber communications. More particularly, it relates to an optical fiber having a greater range of wavelengths and core diameters for which the optical fiber exhibits single-mode operation.

BACKGROUND

As the world's need for communication capacity continues to increase, the use of optical signals to transfer large amounts of information has become increasingly favored over other schemes such as those using twisted copper wires, coaxial cables, or microwave links. Optical communication systems use optical signals to carry information at high speeds over an optical path such as an optical fiber. Optical fiber communication systems are generally immune to electromagnetic interference effects, unlike the other schemes listed above. Furthermore, the silica glass fibers used in fiber optic communication systems are lightweight, comparatively low cost, and are able to carry tens, hundreds, and even thousands of gigabits per second across substantial distances.

A conventional optical fiber is essentially an optical waveguide having an inner core and an outer cladding, the cladding having a lower index of refraction than the core. Because of the difference in refractive indices, the optical fiber is capable of confining light that is axially introduced into the core and transmitting that light over a substantial distance. Because they are able to guide light due to total internal reflection principles, conventional optical fibers are sometimes referred to as index-guiding fibers.

Conventional optical fibers have a solid cross-section and are made of fused silica, with the core region and the cladding region having different levels of dopants (introduced impurities) to result in the different indices of refraction. The cladding is usually doped to have a refractive index that ranges from 0.1% (single mode fibers) to 2% (multi-mode fibers) less than the refractive index of the core, which itself usually has a nominal refractive index of 1.47.

As known in the art, single-mode fiber is preferred over multi-mode fiber for high-capacity, long-distance optical communications. Single-mode fiber prevents electromagnetic waves from traveling down in the fiber in anything but a single, tightly held mode near its center axis. This is in contrast to multi-mode fiber, in which incident electromagnetic waves may travel down the fiber over several paths of differing distances. Accordingly, single-mode fiber allows for reduced group delay, and thereby allows optical signals to better keep their shape as they travel down the fiber.

Figure 1:
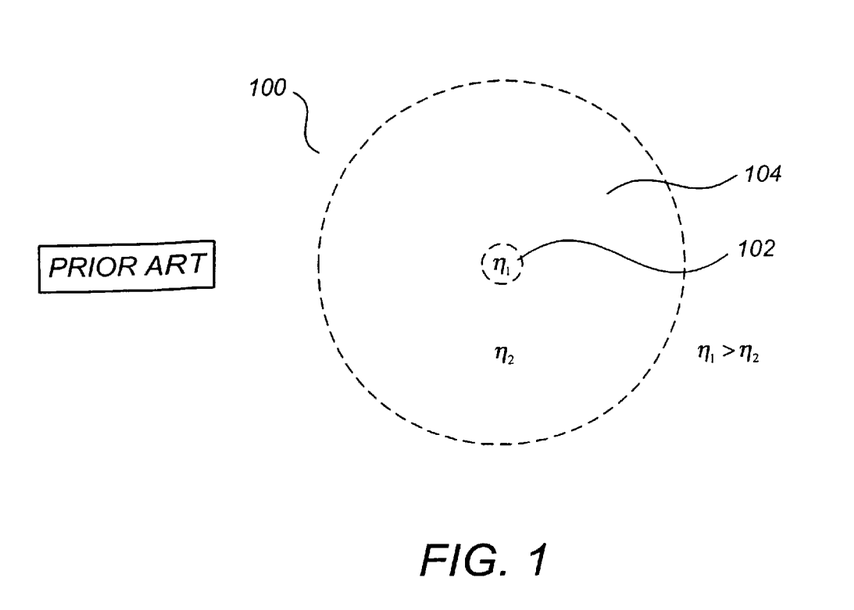
FIG. 1 illustrates a diagram of a cross-section of a prior art optical fiber.

FIG. 1 illustrates a cross-section of a conventional optical fiber 100 comprising a solid core region 102 surrounded by a solid cladding region 104. As described in Dutton, *Understanding Optical Communications*, Prentice-Hall (1998), which is incorporated by reference herein, at p. 45, optical fibers may be made single-mode by (i) making the core region thin enough, (ii) making the refractive index difference between the core and the cladding small enough, or (iii) using a longer wavelength. More particularly, as described in Hecht, *Understanding Fiber Optics*, Prentice-Hall (1999), which is incorporated by reference herein, at pp. 68–71, for a given propagation wavelength $\lambda$, a maximum core diameter $D_{max}$ for single-mode operation is given by Eq. (1) below, where $n_1$ is the refractive index of the core material, $n_2$ is the refractive index of the cladding material can be represented by:

$$D_{max} = \frac{2.4\lambda}{\pi\sqrt{n_1^2 - n_2^2}} \quad \{1\}$$

Also as described in Hecht, supra, for a given core diameter D, a cutoff wavelength $\lambda_c$ below which propagation becomes multi-mode can be given by Eq. (2):

$$\lambda_c = \frac{\pi D \sqrt{n_1^2 - n_2^2}}{2.4} \quad \{2\}$$

More generally, a condition for which single-mode propagation will occur can be stated in terms of the ratio of the core diameter D to the wavelength $\lambda$ according to Eq. (3):

$$\frac{D}{\lambda} \geq \frac{2.4}{\pi\sqrt{n_1^2 - n_2^2}} \quad \{3\}$$

From a practical implementation perspective, it is desirable to make the diameter of the core region as large as possible while still maintaining single-mode operation in the wavelengths of operation. A larger core diameter allows for light to be more easily introduced into the fiber from light sources, thereby reducing the costs of both light sources and optical coupling equipment. A larger core diameter also allows for looser tolerances (i.e., reduced costs) in fiber splicing operations, and allows for other practical advantages. As indicated by Eq. (3) above, the maximum allowable core diameter increases as the refractive indices of the core material and cladding material get closer together. Of course, as these refractive indices get closer together, a corollary result is that the optical fiber may be made single-mode across a wider range of wavelengths for a fixed core diameter.

A problem, however, arises with conventional optical fibers in that current optical fiber manufacturing methods are restricted in their ability to precisely control the indices of refraction of the core material ($n_1$) and the cladding material ($n_2$). Because of this restricted ability, in commercially practical fiber the closeness of $n_1$ and $n_2$ is usually limited by design to no less than 0.1%. This, in turn, restricts the designed size of the core diameter for a given wavelength, and/or restricts the wavelengths of single-mode operation of a fiber for a given core diameter. For example, one common optical fiber manufacturing method referred to as flame hydrolysis uses a burner to fire a combination of metal halide particles and $SiO_2$ (called a "soot") onto a rotating graphite or ceramic mandrel to make the optical fiber perform. See Keiser, *Optical Fiber Communications*, $2^{nd}$ ed., McGraw- Hill (1991), which is incorporated by reference herein, at pp. 63–68. The index of refraction is controlled by controlling the constituents of the metal halide vapor stream during the deposition process. The process is "open loop" without a feedback mechanism to precisely control the ultimate index of refraction of the optical material. Moreover, the metal halide vapor stream is limited in its controllability and in its ability to control the ultimate index of refraction of the optical material.

Thus, the above flame hydrolysis technique and similar prior art methods used to vary the relative refractive indices of the core and cladding material, which are generally referred to as "chemical" techniques herein, are generally limited in their ability to control these indices to closer than 0.1% from each other. Also, these techniques may introduce a substantial amount of unwanted impurities into the optical fiber, increasing Rayleigh scattering and reducing the quality and effectiveness of the optical fiber. Furthermore, a substantial degree of unwanted local or global variations in the doping may occur in the chemical deposition process and, because the optical fiber preform cannot be reheated to high temperatures without losing its desired refractive index profile, these variations remain in the final optical fiber and lessen its quality and effectiveness.

One wavelength band of great significance is the 1500–1610 nm band of operation of Erbium-Doped Fiber Amplifiers (EDFAs) used in most high-capacity, long-distance Dense Wavelength Division Multiplexing (DWDM) optical communications systems. Applying a refractive index difference of 0.1% between the core and the cladding and a wavelength of 1500 nm in Eq. (1), the maximum diameter of a conventional solid-core fiber would be about 17.8 $\mu$m for single-mode operation; applying a wavelength of 1100 nm in Eq. (1), the maximum diameter of a conventional solid-core fiber would be about 13.1 $\mu$m for single-mode operation. More commonly, a larger refractive index difference of 0.2% between the core and the cladding is used, for which the maximum diameter of a conventional solid-core fiber would be about 13.1 $\mu$m for a wavelength of 1500 nm and 9.6 $\mu$m for a wavelength of 1100 nm. For the conventional optical fiber 102 of FIG. 1, the core diameter is commonly about 9 $\mu$m and the cladding diameter is commonly about 125 $\mu$m. It would be desirable to increase the maximum core diameter of a single-mode fiber so that lower-cost optical sources, optical coupling components, and optical splicing components can be used therewith, and implementation can be otherwise improved.

Also using the best chemical techniques for a 0.1% refractive index difference between the core and cladding regions, Eq. (2) yields a cutoff wavelength of about 774 nm for the conventional optical fiber 102 of FIG. 1 having a core diameter of 9 $\mu$m. For the more commonly used 0.2% refractive index difference between the core and the cladding, the cutoff wavelength would be about 1100 $\mu$m. It would be desirable to further decrease the single-mode cutoff wavelength of an optical fiber.

Accordingly, it would be desirable to provide an optical fiber that, for a given wavelength of operation, provides single-mode propagation for larger core diameters.

It would be further desirable to provide an optical fiber that, for a given core diameter, provides single-mode propagation across an increased range of wavelengths.

It would be still further desirable to provide an optical fiber having increased precision in the relative refractive indices of the core and cladding regions to allow for closer designed differences therebetween.

It would be even further desirable to provide an optical fiber in which refractive index differences between the core and cladding regions may be achieved without the introduction of dopants, thereby allowing the optical fiber to comprise highly purified silica glass and to exhibit reduced dopant-induced adverse effects such as Rayleigh scattering.

SUMMARY

In accordance with a preferred embodiment, an optical fiber having extended single-mode capabilities is provided, wherein subwavelength microstructural voids are introduced into the core and/or cladding to allow a fine tuning of the difference between their effective refractive indices. It has been found that the introduction of subwavelength microstructures into the optical material, preferably through a photolithographic process at the preform stage, allows for control of the effective refractive index difference between the core and the cladding that is more precise than the control afforded by chemical doping processes (e.g., flame hydrolysis) alone. The preferred embodiments take advantage of the fact that a preform slice exposed to a photolithographic process will have core and cladding regions that generally experience similar variations from nominal etching sizes during the process, and therefore highly precise area differences between voids in the core and cladding regions may be photolithographically achieved. Accordingly, the resulting effective refractive index difference between the core and the cladding may be made smaller, thereby allowing the optical fiber to exhibit single-mode properties for larger core diameters. In one preferred embodiment, for example, an optical fiber having a diameter of 25 microns and a single-mode cutoff wavelength of 1500 nm is provided. Advantageously, lower-cost optical sources, optical coupling components, and optical splicing components can be used with this optical fiber.

According to a preferred embodiment, a core portion is formed using a core material and a cladding portion is formed using a cladding material, the core and cladding materials having indices of refraction that differ by $\Delta n$ percent or greater. Microstructural voids are formed in the core and/or cladding portions sufficient to cause their effective indices of refraction to be 0.5 $\Delta n$ percent or less. In one exemplary embodiment, for example, a refractive index of the cladding material is 1.47, while the a refractive index of the core material is 0.1% greater at 1.47147. At the preform stage of optical fiber fabrication and prior to drawing, a void pattern occupying 10.0% of the cladding area is formed into the cladding, while a void pattern occupying 10.2% of the core area is formed into the core. The resulting optical fiber has a fine-tuned refractive index difference between the core and the cladding that is about 0.05%.

Any of several combinations of material refractive index selections and void area selections may be made in accordance with the preferred embodiments, provided that the resulting optical fiber has a core effective refractive index greater than the cladding effective refractive index. For example, the core material may be selected to have a refractive index less than the cladding material, with more and/or greater microstructural voids being introduced into the cladding than the core to reduce the cladding effective refractive index to less than (and within a close tolerance to) the core effective refractive index. In an alternative embodiment, the core and cladding materials may be identical, with a greater percentage of cladding cross-sectional area being occupied by voids than core cross-sectional area. Advantageously, according to this embodiment, no chemical doping is necessary at all, and the material may be heated prior to the photolithographic process to very high temperatures to remove impurities. The resulting fiber will comprise highly purified silica glass and will exhibit reduced dopant-induced adverse effects such as Rayleigh scattering.

According to a preferred embodiment, further precision in effective refractive index difference between the core and cladding may result from selective choices of the specific void patterns used. For example, to effectuate void ratios of 50.0% and 50.1% in the core and cladding, respectively, identical first patterns of larger circles designed to occupy 50.0% of the area may be formed in both the core and cladding. Then a second, distinct pattern of smaller circles may be formed in the cladding region designed to occupy 0.1% of the area. Because the core and cladding regions will generally experience the same variations in their first patterns of larger circles in the photolithographic process, and because any variations in the smaller circles have a smaller effect on the overall void area in the cladding, tolerance to variations in the photolithographic process may be further enhanced, thereby enhancing precision in the effective refractive index difference between the core and cladding regions.

DETAILED DESCRIPTION

Figure 2:
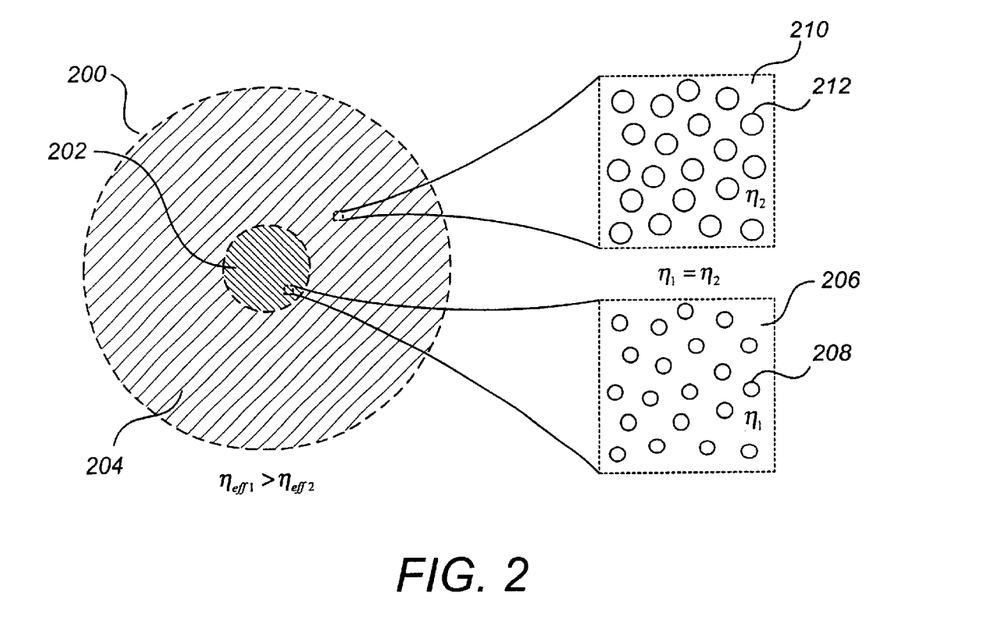
FIG. 2 illustrates a diagram of a cross-section of a microstructured index-guiding optical fiber according to a preferred embodiment in which the core material and cladding material have identical refractive indices.

FIG. 2 illustrates a cross-section of a microstructured index-guiding optical fiber 200 according to a preferred embodiment. Optical fiber 200 comprises a core region 202 surrounded by a cladding region 204. Core region 202 comprises core material 206 having an index of refraction $n_1$, while cladding region 204 comprises cladding material 210 having an index of refraction $n_2$ such that $n_2=n_1$. Preferably, the core material 206 and cladding material 210 are identical and comprise purified silica glass. Advantageously, according to this embodiment, the optical fiber 200 may be fabricated using no chemical doping process at all. Also, even if some uniform doping is used for other purposes, the optical fiber material may be heated prior to the photolithographic process to very high temperatures to remove impurities, which cannot be done with standard optical fibers because they can lose their desired refractive index profile. The resulting fiber will comprise highly purified silica glass and will exhibit reduced dopant-induced adverse effects such as Rayleigh scattering.

Core region 202 also comprises a first plurality of voids 208 therein which are elongated and run parallel to the axis of the optical fiber 200. In the embodiment of FIG. 2, voids 208 have a circular cross-section and form a generally cylindrical void running parallel to the fiber axis, although the voids may generally be any of a variety of shapes in accordance with the preferred embodiments. Importantly, however, their dimensions should be substantially less than the wavelength λ of the light being transmitted, preferably on the order of magnitude of 0.1λ or less. Cladding region 204 comprises a second plurality of voids 212 configured and dimensioned to occupy a greater percentage of cross-sectional area than the voids 208. The voids 208 and 212 are preferably formed into the core region 202 and cladding region 204, respectively, according to a photolithographic process at the preform stage of manufacture and prior to drawing of the optical fiber, as described in Ser. Nos. 09/591,474 and 09/781,343, supra.

To a first approximation, Ser. No. 09/591,474 supra now U.S. Pat. No. 6,418,258 provides one formula for computing the effective index of refraction $n_{eff}$ of an optical material having an index of refraction n into which subwavelength air voids occupying a ratio V of its cross-sectional area are formed. To a more precise approximation, the effective index of refraction $n_{eff}$ is given by Eq. (4) below:

$$n_{eff} = \sqrt{n^2 - (n^2 - 1)V} \qquad \{4\}$$

Thus, for an index-guiding microstructured optical fiber having a core material with a refractive index of $n_1$ with a core void-to-cross-section ratio of $V_1$, and having a cladding material with a refractive index of $n_2$ with a cladding void-to-cross-section ratio of $V_2$, the effective refractive indices are given by Eqs. (5) and (6) below:

$$n_{eff1} = \sqrt{n_1^2 - (n_1^2 - 1)V_1} \qquad \{5\}$$

$$n_{eff2} = \sqrt{n_2^2 - (n_2^2 - 1)V_2} \qquad \{6\}$$

Because a preform slice exposed to a photolithographic process will have core and cladding regions that generally experience similar variations from nominal etching sizes during the process, a highly precise area difference $\Delta V = V_2 - V_1$ between the core and cladding regions can be specified. For example, reliable area differences down to 0.1% may be specified. Using the relationships of Eqs. (1) and (4), and using pure silica glass (n=1.4700) as the optical material, Table 1 below summarizes, for several different void-to-cross-section ratios, the effective refractive index differences, maximum single-mode core diameters for optical fibers capable of single-mode propagation down to 1500 nm, maximum single-mode core diameters for optical fibers capable of single-mode propagation down to 1100 nm, and cutoff wavelengths for optical fibers having a core diameter of 9 μm.

In one exemplary preferred embodiment, to effectuate the void areas for the 10.0% and 10.1% void ratios from Table 1, for example, a slice of preform 0.1 cm–1.0 cm thick having a diameter of about 10 cm is photolithographically etched with circular holes having a diameter of 100.0 μm in the core region and 100.5 μm in the cladding region. The core region may be selected to have a diameter of 2.5 cm. The 100 μm core holes are distributed in a periodic or semiperiodic or other pattern around the core region so as to occupy 10.0% of the core area (e.g., 6,250 holes with average center-to-center spacings of about 280 μm). The 100.5 μm cladding holes can be distributed, e.g., in an identical pattern around the cladding area, with center-to-center spacings and positions being identical to those of the core holes. After successive slices are subsequently fused and the preform is drawn such that its diameter decreases by a factor of 1000, the optical fiber will have a nominal core diameter of 25 μm, a cladding diameter of 100 μm, and each slice will have contributed 1 km–10 km of length to the optical fiber. The void area-to-cross-section ratios of 10.0% and 10.1% will have been substantially preserved, such that an effective refractive index difference of 0.028% can be achieved. The core and cladding holes will have nominal diameters of 100 nm and 100.5 nm, respectively, with nominal average center-to-center spacings of 280 nm. The optical fiber will be single-mode below 1500 nm down to a cutoff wavelength of about 1116 nm.

TABLE 1

Core Diameters for Single-Mode Propagation; $n_1 = n_2$
(Base material n = 1.4700)

| Material Refractive Index Difference (Core = Cladding) | Core Void Area (%) | Cladding Void Area (%) | Effective Refractive Index Difference | $D_{max}$, $\lambda = $ 1.5 μm | $D_{max}$, $\lambda = $ 1.1 μm | $\lambda_c$ for D = 9 μm (nm) |
|---|---|---|---|---|---|---|
| 0.0% | 0.0 | 0.1 | 0.027% | 33.6 μm | 24.7 μm | 401 |
| " | 10.0 | 10.1 | 0.028% | 33.6 μm | 24.7 μm | 401 |
| " | 50.0 | 50.1 | 0.037% | 33.6 μm | 24.7 μm | 401 |
| " | 90.0 | 90.1 | 0.052% | 33.6 μm | 24.7 μm | 401 |

Using the photolithographically-achievable void-to-cross-section differences specified above, the core diameter of the resulting optical fiber could be increased to about 33 μm while still maintaining single-mode propagation down to 1500 nm, and could be increased to about 24 μm while still maintaining single-mode propagation down to 1100 nm. Increased core diameters will, in turn, relax the coupling requirements for coupling the index-guiding microstructured optical fiber to other optical components, and thereby reduce the cost of packaging of single-mode optical components. In addition, higher optical power may be propagated in fibers with larger core diameters since the larger core diameter reduces the power density therein. Also, for a given fixed core diameter size of 9 μm, for example, single-mode operation would be realized down to a cutoff wavelength of 401 nm for each of the cases in Table 1.

Figure 3:
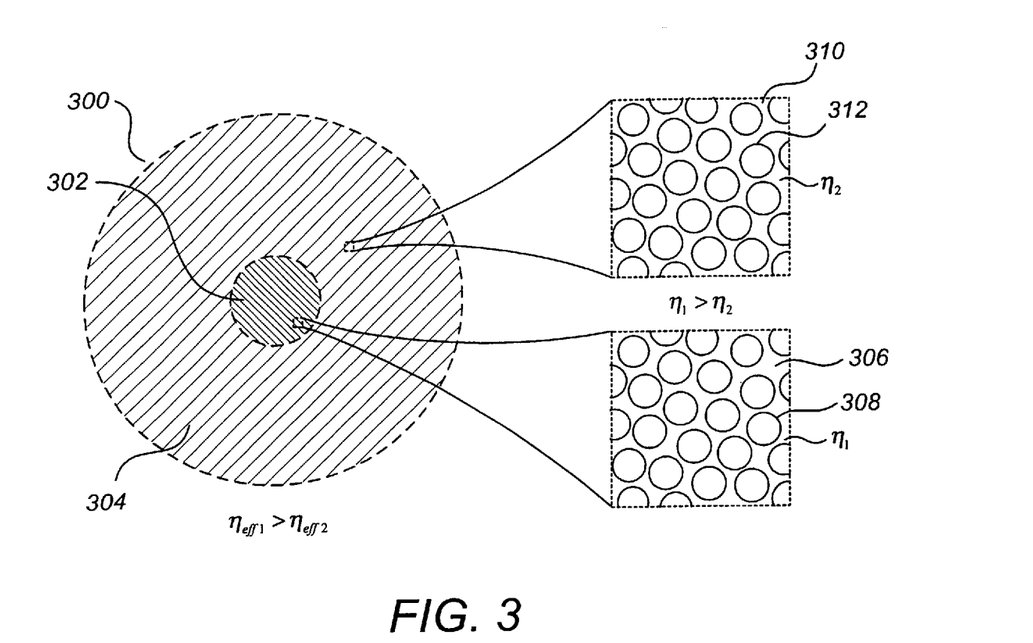
FIGS. 3 and 4 each illustrate a diagram of a cross-section of a microstructured index-guiding optical fiber according to a preferred embodiment in which the core material has a greater refractive index than the cladding material.

FIG. 3 illustrates a diagram of a cross-section of a microstructured index-guiding optical fiber 300 according to a preferred embodiment comprising a core region 302 and a cladding region 304, the core region 302 comprising core material 306 and the cladding region 304 comprising cladding material 310, wherein the core material 306 has a greater refractive index than the cladding material 310. In the embodiment of FIG. 3, the core region 302 comprises voids 308 that are identical in size, configuration, and cross-sectional area to voids 312 contained in cladding region 304. Provided that the void-to-cross-section ratio is substantially large, e.g., 60% or greater, the differences in effective refractive index between the core and cladding may be made substantially smaller than would otherwise be provided by typical chemical doping processes alone. Furthermore, because the void patterns are precisely the same, there is no percentage variation to maintain between the core and cladding regions, and therefore any variations in the photolithographic process, which have substantially similar effects on the core and cladding regions, will be of minor consequence in the "fine tuning" of the effective refractive indices. Table 2 below summarizes the resulting optical fiber characteristics using a 0.1% refractive index between the materials and a range of void-to-cross-section ratios at 60.0% and above.

TABLE 2

Core Diameters for Single-Mode Propagation; $V_1 = V_2$
(Base material n = 1.4700)

| Material Refractive Index Difference (Core > Cladding) | Core Void Area (%) | Cladding Void Area (%) | Effective Refractive Index Difference | $D_{max}$, $\lambda = $ 1.5 μm | $D_{max}$, $\lambda = $ 1.1 μm | $\lambda_c$ for D = 9 μm (nm) |
|---|---|---|---|---|---|---|
| 0.1% | 60.0 | ←→same | 0.059% | 27.6 μm | 20.2 μm | 490 |
| " | 70.0 | ←→same | 0.048% | 31.8 μm | 23.3 μm | 424 |
| " | 80.0 | ←→same | 0.035% | 39.0 μm | 28.6 μm | 346 |
| " | 90.0 | ←→same | 0.019% | 55.1 μm | 40.4 μm | 245 |

Figure 4:
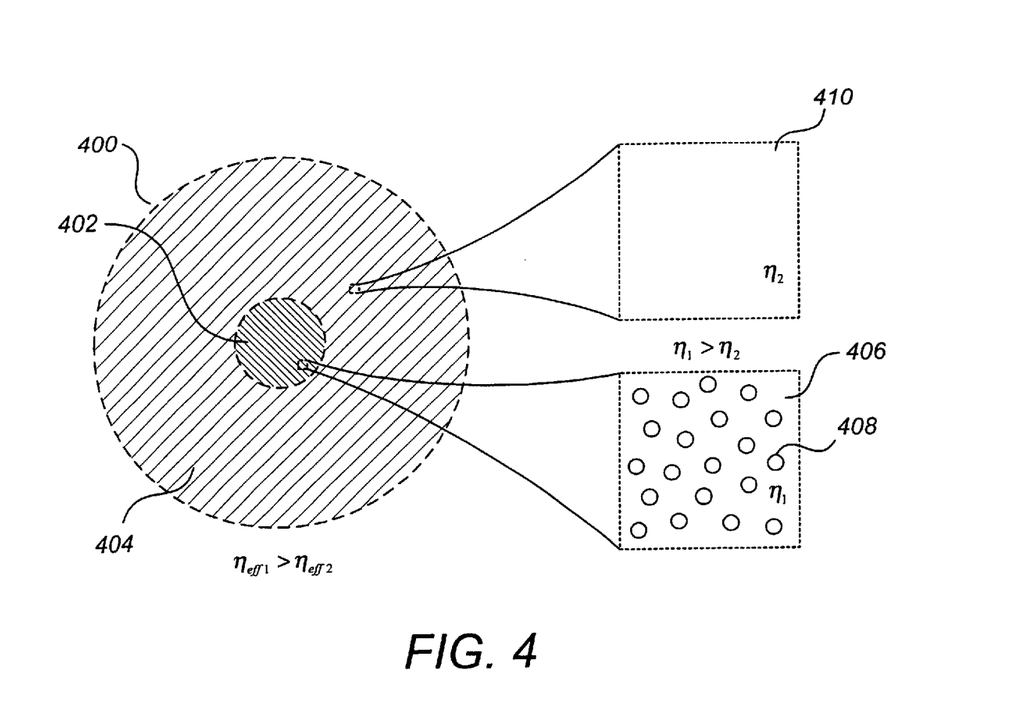

FIG. 4 illustrates a diagram of a cross-section of a microstructured index-guiding optical fiber 400 according to a preferred embodiment comprising a core region 402 and a cladding region 404, the core region 402 comprising core material 406 and the cladding region 404 comprising cladding material 410, wherein the core material 406 has a greater refractive index than the cladding material 410, and wherein microstructural voids are introduced into the core to "fine tune" its effective index of refraction. In a another preferred embodiment (not shown), microstructural voids may also be introduced into the cladding region, provided that additional, commensurately size voids are also formed in the core region and/or the area of the core voids is commensurately increased. Table 3 below summarizes the resulting optical fiber characteristics using a variety of refractive index differences and void-to-cross-section ratios according to the preferred embodiments. As shown therein, in each case for which there is a material refractive index difference of Δn, a proper and physically realizable void-to-cross-section ratio area difference between the core and cladding may be selected such that the resulting effective refractive indexes differ by less than 0.5 Δn.

TABLE 3

Core Diameters for Single-Mode Propagation; $n_1 > n_2$
(Base material n = 1.4700)

| Material Refractive Index Difference (Core > Cladding) | Core Void Area (%) | Cladding Void Area (%) | Effective Refractive Index Difference | $D_{max}$, $\lambda = $ 1.5 μm | $D_{max}$, $\lambda = $ 1.1 μm | $\lambda_c$ for D = 9 μm (nm) |
|---|---|---|---|---|---|---|
| 0.1% | 0.3 | 0.0 | 0.019% | 39.8 μm | 29.2 μm | 339 |
| " | 10.2 | 10.0 | 0.038% | 29.0 μm | 21.3 μm | 465 |
| " | 50.1 | 50.0 | 0.032% | 36.3 μm | 26.6 μm | 372 |
| " | 90.0 | 90.0 | 0.019% | 55.1 μm | 40.4 μm | 245 |
| 0.2% | 0.6 | 0.0 | 0.038% | 28.3 μm | 20.8 μm | 476 |
| " | 10.6 | 10.0 | 0.019% | 41.3 μm | 30.3 μm | 327 |
| " | 50.3 | 50.0 | 0.026% | 40.1 μm | 29.4 μm | 337 |
| " | 90.0 | 90.0 | 0.039% | 39.0 μm | 28.6 μm | 347 |
| 1.0% | 3.5 | 0.0 | 0.030% | 32.0 μm | 23.5 μm | 422 |
| " | 13.2 | 10.0 | 0.013% | 48.8 μm | 35.8 μm | 277 |
| " | 51.7 | 50.0 | 0.039% | 32.5 μm | 23.8 μm | 415 |
| " | 90.3 | 90.0 | 0.033% | 42.4 μm | 31.1 μm | 318 |

Figure 5:
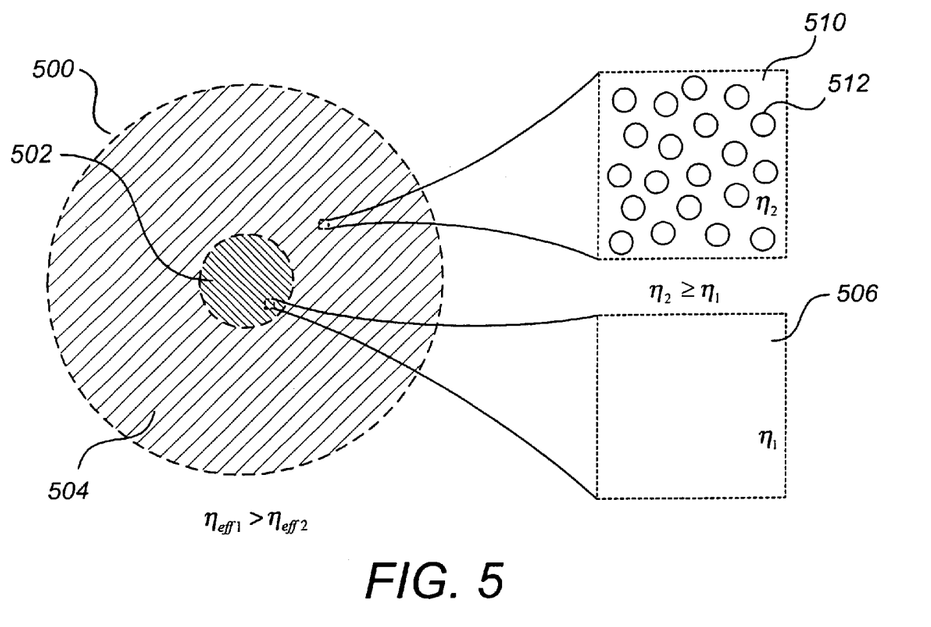
FIG. 5 illustrates a diagram of a cross-section of a microstructured index-guiding optical fiber according to a preferred embodiment in which the cladding material has a refractive index greater than or equal to that of the core.

FIG. 5 illustrates a diagram of a cross-section of a microstructured index-guiding optical fiber 500 according to a preferred embodiment comprising a core region 502 and a cladding region 504, the core region 502 comprising core material 506 and the cladding region 504 comprising cladding material 510, wherein the core material 506 has a lesser refractive index than the cladding material 510, and wherein microstructural voids are introduced into the cladding to reduce and "fine tune" its effective index of refraction to a value below the index of refraction of the core. Table 4 below summarizes the resulting optical fiber characteristics using an exemplary refractive index difference of 0.2% and several void-to-cross-section ratios according to the preferred embodiments. Thus, even in an "inverted" scenario in which the native core material has a lesser refractive index than the cladding material, microstructural voids may be introduced so that single-mode propagation is exhibited for standard DWDM wavelengths using comparatively large core diameters.

TABLE 4

Core Diameters for Single-Mode Propagation, $n_2 > n_1$
(Base material n = 1.4700)

| Material Refractive Index Difference (Cladding > Core) | Core Void Area (%) | Cladding Void Area (%) | Effective Refractive Index Difference | $D_{max}$, $\lambda = 1.5\ \mu m$ | $D_{max}$, $\lambda = 1.1\ \mu m$ | $\lambda_c$ for D = 9 $\mu m$ (nm) |
|---|---|---|---|---|---|---|
| 0.2% | 0.0 | 0.8 | 0.016% | 43.2 $\mu m$ | 31.7 $\mu m$ | 313 |
| " | 10.0 | 10.8 | 0.038% | 28.9 $\mu m$ | 21.2 $\mu m$ | 467 |
| " | 50.0 | 50.5 | 0.048% | 29.4 $\mu m$ | 21.5 $\mu m$ | 460 |
| " | 90.0 | 90.2 | 0.066% | 29.8 $\mu m$ | 21.9 $\mu m$ | 452 |

Figure 6:
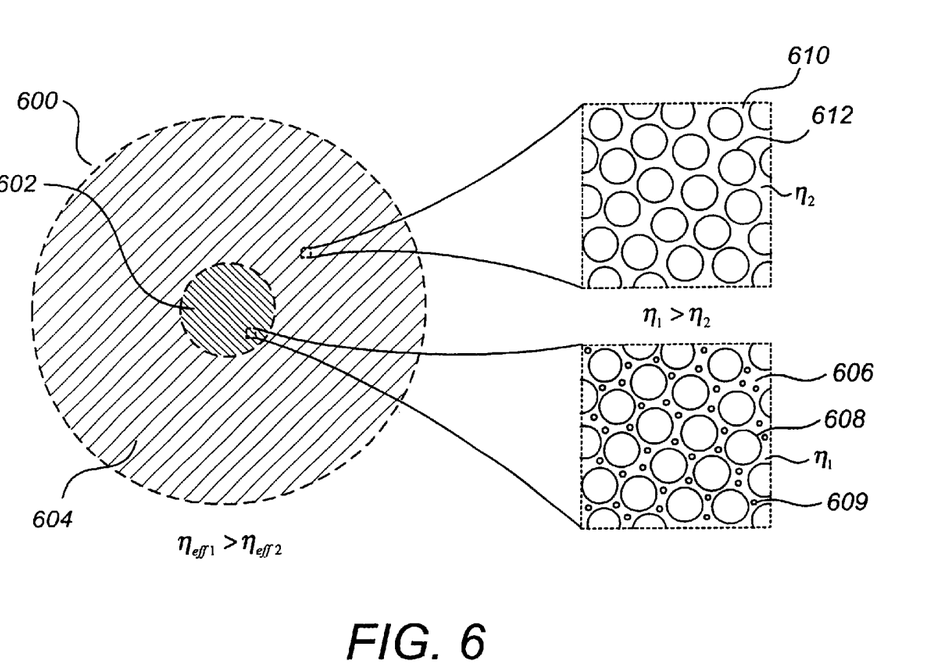
FIG. 6 illustrates a diagram of a cross-section of a microstructured index-guiding optical fiber according to a preferred embodiment in which the core material has a greater refractive index than the cladding material.

FIG. 6 illustrates a diagram of a cross-section of a microstructured index-guiding optical fiber 600 according to a preferred embodiment comprising a core region 602 and a cladding region 604, the core region 602 comprising core material 606 and the cladding region 604 comprising cladding material 610, wherein the core material 606 has a greater refractive index than the cladding material 610. In the embodiment of FIG. 6, substantially identical first patterns of voids 608 and 612 are formed in the core and cladding materials, respectively, occupying a first percentage of the cross-sectional areas of each. Preferably, this first percentage is equal to the desired cross-sectional percentage of void area in the cladding region (e.g., 50.0% using an example from line 3 of Table 3, supra). A second, distinct, and non-overlaying pattern of smaller voids 609 is also formed in the cladding region and designed to occupy 0.1% of the cross-sectional area of the core region. It is this second pattern of smaller voids that achieves the small yet controllable difference in the void-to-cross-section ratios of the core and cladding regions. Because the core and cladding regions will generally experience the same variations in their first patterns of larger circles in the photolithographic process, and because any variations in the smaller circles have a smaller effect on the overall void area in the cladding, tolerance to variations in the photolithographic process may be further enhanced, thereby enhancing precision in the effective refractive index difference between the core and cladding regions.

In one exemplary preferred embodiment, to effectuate the void areas for the 50.0% and 50.1% void ratios from the line of Table 3 in which the core material and cladding material refractive indices differ by 0.1%, for example, the slice of preform 0.1cm–1.0 cm thick having a diameter of about 10 cm is photolithographically etched with circular holes having a diameter of 100.0 $\mu m$ in both the core region and the cladding region. The core region may be selected to have a diameter of 2.5 cm. The 100 $\mu m$ core holes are distributed in a periodic or semiperiodic or other pattern around the core and cladding regions so as to occupy 50.0% of the area (e.g., 500,000 holes with average center-to-center spacings of about 125 $\mu m$). An additional set of smaller holes is distributed interstitially between the holes in the core region such that one smaller hole is included for each larger hole and such that the area of the smaller hole is 0.2% of the area of the larger hole. Where the additional smaller hole is circular, each would have a diameter of 4.5 $\mu m$. After successive slices are subsequently fused and the preform is drawn such that its diameter decreases by a factor of 1000, the optical fiber will have a nominal core diameter of 25 $\mu m$ and a cladding diameter of 100 $\mu m$, and each slice will have contributed 1 km–10 km of length to the optical fiber. The void area-to-cross-section ratios of 50.1% and 50.0% will have been substantially preserved, such that an effective refractive index difference of about 0.032% is achieved. The larger core and cladding holes will have nominal diameters of 100 nm with average center-to-center spacings of 125 nm. The smaller core holes will have nominal diameters of 4.5 nm. The optical fiber will be single-mode below 1500 nm down to a cutoff wavelength of about 1033 nm.

The use of the preferred index-guiding microstructured optical fiber provides a variety of advantages in addition to enhanced single-mode operation. Especially where a substantial amount of the optical material, such as 50% or greater, has been removed during the photolithographic process, the index-guiding microstructured optical fiber has very low attenuation and dispersion as compared to prior art solid-cross-section fibers across a wide range of wavelengths.

Whereas many alterations and modifications of the present invention will no doubt become apparent to a person of ordinary skill in the art after having read the foregoing description, it is to be understood that the particular embodiments shown and described by way of illustration are in no way intended to be considered limiting. For example, although the above preferred embodiments are described in the context of step-index fibers, they may also be applied in the context of graded-index fibers, dispersion-shifted fibers, or other types of optical fibers. As an additional example, various conventional parameters described supra, such as the minimum 0.1% refractive index difference between the core and the cladding in conventional fibers, are given by way of example only. In the event that developing chemical techniques may exhibit finer control over the refractive index difference between the core and cladding regions, the preferred embodiments described infra may nevertheless be applied to further enhance the results.

As a further example, although the shapes used in the core and cladding void patterns are shown as being circular, any of a variety of shapes may be used without departing from the scope of the preferred embodiments, including shapes that may provide superior "fine tuning" of the relative cross-sectional areas of the core and cladding void patterns in light of the photolithographic processes used to form these void patterns. The voids may be vacuum, or may be filled with air or some other gas such as noble gas, at a selected pressure that can be the same as or lower or higher than atmospheric pressure or may be a solid material. Where formulas are given in the description above, it should be understood that they may approximate rather than absolutely represent the behavior and results achieved with practical materials and processes. Therefore, reference to the details of the preferred embodiments are not intended to limit their scope, which is limited only by the scope of the claims set forth below.

What is claimed is:

1. An optical fiber, comprising:
   a core region comprising a first optical fiber material structured to form a first plurality of voids therein, said first plurality of voids occupying a first percentage of a cross-sectional area of said core region; and
   a cladding region surrounding said core region, said cladding region comprising a second optical fiber material structured to form a second plurality of voids therein, said second plurality of voids occupying a second percentage of a cross-sectional area of said cladding region;
   wherein said first and second plurality of voids have dimensions substantially smaller than the wavelength of light being used;
   wherein said optical fiber propagates light by an index guiding effect; and
   wherein said first and second optical fiber materials and said first and second percentages of cross-sectional area are selected such that an effective index of refraction of said cladding region is less than an effective index of refraction of said core region and within 0.05% thereof.

2. The optical fiber of claim 1, wherein said core region has a diameter of at least 20 micrometers, and wherein said optical fiber has a single mode cutoff wavelength of less than 1100 nm.

3. The optical fiber of claim 2, wherein said first optical fiber material has an index of refraction equal to that of said second optical fiber material, and wherein an effective refractive index difference between said core and cladding regions is achieved through different selections for said first percentage and said second percentage of cross-sectional areas.

4. The optical fiber of claim 3, wherein said first percentage of cross-sectional area is selected to be between 10.0% and 90.0%, inclusive, and wherein said second percentage of cross-sectional area is selected to be about 0.1% greater than said first percentage.

5. The optical fiber of claim 4, said first plurality of voids comprising a primary void pattern dimensioned to occupy said first percentage of cross-sectional area of said core region, said second plurality of voids comprising:
   a first void pattern matching said primary void pattern and occupying a percentage of a cross-sectional area of said cladding region that is the same as said first percentage; and
   a secondary void pattern distinct from, and non-overlaying with, said first void pattern, said secondary void pattern being dimensioned to occupy a differential percentage of a cross-sectional area of said cladding region equal to the difference between said second percentage and said first percentage.

6. The optical fiber of claim 4, said first plurality of voids comprising a primary void pattern dimensioned to occupy said first percentage of cross-sectional area of said core region, said second plurality of voids comprising an enlarged version of said first void pattern enlarged by an amount sufficient to occupy said second percentage of cross-sectional area of said cladding region.

7. The optical fiber of claim 2, wherein said first material is selected to have an index of refraction at least 0.05% greater than an index of refraction of said second material, and wherein said first percentage of cross-sectional area is selected to be greater than said second percentage of cross-sectional area by an amount sufficient to cause the effective index of refraction of said core region to be greater than the effective index of refraction of said cladding region and within 0.05% thereof.

8. The optical fiber of claim 7, wherein said first and second percentages of cross-sectional area differ by an amount greater than or equal to 0.1%, whereby said first and second plurality of voids may be dimensioned to within photolithographic tolerances for patterning preform slices in the manufacture of said optical fiber.

9. The optical fiber of claim 8, said second plurality of voids comprising a primary void pattern dimensioned to occupy said second percentage of cross-sectional area of said cladding region, said first plurality of voids comprising:
   a first void pattern matching said primary void pattern and occupying a percentage of a cross-sectional area of said core region that is the same as second percentage; and
   a secondary void pattern distinct from, and non-overlaying with, said first void pattern, said secondary void pattern being dimensioned to occupy a differential percentage of said cross-sectional area of said cladding region equal to the difference between said first percentage and said second percentage.

10. The optical fiber of claim 2, wherein said first material is selected to have an index of refraction less than an index of refraction of said second material by at least 0.05%, and wherein said second percentage of cross-sectional area is selected to be greater than said first percentage of cross-sectional area by an amount sufficient to cause the effective index of refraction of said cladding region to be less than the effective index of refraction of said core region and within 0.05% thereof.

11. The optical fiber of claim 10, wherein said first and second percentages of cross-sectional area differ by an amount greater than or equal to 0.1%, whereby said first and second plurality of voids may be dimensioned to within photolithographic tolerances for patterning preform slices in the manufacture of said optical fiber.

12. The optical fiber of claim 11, said second plurality of voids comprising a primary void pattern dimensioned to occupy said second percentage of cross-sectional area of said cladding region, said first plurality of voids comprising:
   a first void pattern matching said primary void pattern and occupying a percentage of a cross-sectional area of said core region that is the same as said second percentage; and
   a secondary void pattern distinct from, and non-overlaying with, said first void pattern, said secondary void pattern being dimensioned to occupy a differential percentage of said cross-sectional area of said cladding region equal to the difference between said first percentage and said second percentage.

13. The optical fiber of claim 2, wherein said second percentage of cross-sectional area is selected to be equal to said first percentage of cross-sectional area, and wherein an effective refractive index difference between said core and cladding regions is achieved through different selections for the indices of refraction of said first and second materials.

14. The optical fiber of claim 2, wherein said first percentage of cross-sectional area is greater than 80.0%, and wherein said index of refraction of said second material is about 0.1%–0.2% less than said index of refraction of said first material.

15. An optical fiber, comprising:
   a solid core region comprising a core material; and
   a cladding region comprising a cladding material, said cladding region surrounding said core region, said cladding region comprising a pattern of subwavelength structures forming gaps in said cladding material running parallel to an axis of the optical fiber, said pattern occupying a percentage of a cross-sectional area of said cladding region;

wherein said percentage of cross-sectional area is selected such that an effective index of refraction of said cladding region is less than an index of refraction of said core region and within 0.05% thereof.

16. The optical fiber of claim 15, wherein said core region has a diameter of at least 20 micrometers, and wherein said optical fiber has a single mode cutoff wavelength of less than 1100 nm.

17. The optical fiber of claim 16, wherein said cladding material is identical to said core material, and wherein said percentage of cross-sectional area is selected to be 0.1%.

18. The optical fiber of claim 16, wherein said cladding material is selected to have an index of refraction greater than an index of refraction of said core material by at least 0.05%, and wherein said percentage of cross-sectional area is selected to be sufficient to cause the effective index of refraction of said cladding region to be less than the index of refraction of said core region and within 0.05% thereof.

19. The optical fiber of claim 16, wherein said cladding material is selected to have an index of refraction greater than an index of refraction of said core material by about 0.2%, and wherein said percentage of cross-sectional area is selected to be about 0.8%.

20. An optical fiber, comprising:

a core region comprising a core material, said core region comprising a pattern of subwavelength structures forming gaps in said core material running parallel to an axis of the optical fiber, said pattern occupying a percentage of a cross-sectional area of said core region; and a solid cladding region comprising a cladding material having an index of refraction less than an index of refraction of said core material and differing therefrom by more than 0.05%;

wherein said percentage of cross-sectional area is selected such that an effective index of refraction of said core region is greater than an index of refraction of said cladding region and within 0.05% thereof.

21. The optical fiber of claim 20, wherein the index of refraction of said core material exceeds the index of refraction of said cladding material by about 0.1%, and wherein said percentage of cross-sectional area is selected to be about 0.3%.

22. The optical fiber of claim 20, wherein the index of refraction of said core material exceeds the index of refraction of said cladding material by about 0.2%, and wherein said percentage of cross-sectional area is selected to be about 0.6%.

23. The optical fiber of claim 20, wherein the index of refraction of said core material exceeds the index of refraction of said cladding material by about 1.0%, and wherein said percentage of cross-sectional area is selected to be about 3.5%.

24. A microstructured optical fiber for transmitting light within a selected band of wavelengths in single-mode transmission, comprising:

a core surrounded by cladding, each of said core and cladding having a respective effective refraction index;

at least one of the core and the cladding comprising subwavelength microstructures that are interspersed in a selected material and have at least one dimension that is smaller than the wavelengths in said band;

wherein said effective refraction indices differ from each other by an amount controlled by controlling a least one characteristic of said microstructures.

25. An optical fiber as in claim 24 in which each of said core and cladding comprises respective subwavelength microstructures interspersed in a respective selected material.

26. An optical fiber as in claim 25 in which the respective selected materials of the core and cladding have respective refraction indices that are substantially the same, and the difference in said effective refraction indices is achieved through differences between the respective microstructures in the core and cladding.

27. An optical fiber as in claim 25 in which said core and cladding comprise microstructures that are substantially the same and one of said core and cladding additionally comprises microstructures that are different from those in the other.

28. An optical fiber as in claim 25 in which the microstructures in the core differ in size from those in the cladding.

29. An optical fiber as in claim 24 in which said effective refraction indices differ from each other by about 0.5% or less.

30. An optical fiber as in claim 29 wherein said difference in indices is maintained over a length of said fiber exceeding 100 kilometers.

31. An optical fiber as in claim 24 in which said core is solid and only said cladding has said microstructures.

32. An optical fiber as in claim 24 in which said cladding is solid and only said core has said microstructures.

33. An optical fiber as in claim 24 in which said microstructures occupy at least half the area of a cross-section of said fiber.

34. A method of making an optical fiber, comprising the steps of:

forming a core portion using a first material;

forming a cladding portion around said core portion using a second material having an index of refraction that differs from an index of refraction of said core portion by $\Delta n$ percent or greater; and forming microstructural voids in said core or cladding portions sufficient to cause an effective index of refraction of said cladding portion to be less than an effective index of said core portion and to differ therefrom by $0.5\Delta n$ percent or less.

35. The method of claim 34, wherein said step of forming microstructural voids is performed using a photolithographic process on sliced preforms of said optical fiber to remove material therefrom, whereby any dimensional variations in the photolithographic process will occur substantially equally in the core and cladding regions, thereby allowing the resulting effective index differences to be robust against variations in the photolithographic process.

36. The method of claim 34, wherein $\Delta n$ is 0.1%.

37. A method of making an optical fiber, comprising the steps of:

forming a core portion using a core material;

forming a cladding portion around said core portion using a cladding material having an index of refraction equal to the index of refraction of said core portion; and forming microstructural voids in said cladding portion sufficient to cause an effective index of refraction of said cladding portion to be less than an effective index of said core portion and to differ therefrom by 0.05 percent or less.

38. The method of claim 37, further comprising the step of forming microstructural voids in said core portion, wherein a percentage of cross-sectional area occupied by microstructural voids in said core portion is less than a percentage of cross-sectional area occupied by microstructural voids in said cladding portion.

39. The method of claim 38, wherein said step of forming microstructural voids is performed using a photolithographic process on sliced preforms of said optical fiber to remove material therefrom, whereby any dimensional variations in the photolithographic process will occur substantially equally in the core and cladding regions, thereby allowing the resulting effective index differences to be robust against variations in the photolithographic process.

40. A method of making a microstructured optical fiber for transmitting light within a selected band of wavelengths in single-mode transmission, comprising:

forming a core surrounded by cladding, wherein at least one of the core and the cladding comprising subwavelength microstructures that are interspersed in a selected material and have at least one dimension that is smaller than the wavelengths in said band;

said forming comprising causing the core and cladding to have respective effective refraction indices that differ from each other by an amount controlled by controlling a least one characteristic of said microstructures.

41. A method as in claim 40 in which the forming comprises causing the difference between said effective refraction indices to be within about 0.5%.

42. A method as in claim 41 including maintaining said difference in indices over a length of said fiber exceeding 100 kilometers.

* * * * *